(12) United States Patent
Paulik et al.

(10) Patent No.: US 11,226,031 B2
(45) Date of Patent: Jan. 18, 2022

(54) DRIVE ASSEMBLY FOR A VEHICLE, AND VEHICLE COMPRISING THE DRIVE ASSEMBLY

(71) Applicant: ZF Friedrichshafen AG, Friedrichshafen (DE)

(72) Inventors: Sebastian Paulik, Tiefenbach (DE);
Harald Wendl, Vilshofen (DE);
Matthias Kobler, Perlesreut (DE);
Andreas Lachhammer, Ruhstorf (DE)

(73) Assignee: ZF FRIEDRICHSHAFEN AG, Friedrichshafen (DE)

(*) Notice: Subject to any disclaimer, the term of this patent is extended or adjusted under 35 U.S.C. 154(b) by 168 days.

(21) Appl. No.: 16/465,310

(22) PCT Filed: Oct. 24, 2017

(86) PCT No.: PCT/EP2017/077080
§ 371 (c)(1),
(2) Date: May 30, 2019

(87) PCT Pub. No.: WO2018/099654
PCT Pub. Date: Jun. 7, 2018

(65) Prior Publication Data
US 2019/0390762 A1    Dec. 26, 2019

(51) Int. Cl.
*F16H 57/04* (2010.01)
*F16H 57/02* (2012.01)
(Continued)

(52) U.S. Cl.
CPC .......... *F16H 57/0423* (2013.01); *F16H 1/06* (2013.01); *F16H 57/027* (2013.01);
(Continued)

(58) Field of Classification Search
CPC ........ F16H 1/06; F16H 57/027; F16H 57/029; F16H 57/04; F16H 57/0409;
(Continued)

(56) References Cited

U.S. PATENT DOCUMENTS 1,155,163 A * 9/1915 Rice ........................... 74/606 R
3,771,622 A * 11/1973 Hyakumura ........ F16H 57/0457
184/11.2
(Continued)

FOREIGN PATENT DOCUMENTS

DE          10359109 A1      7/2005
DE     102007027769 A1     12/2008
(Continued)

OTHER PUBLICATIONS

Machine translation of JP 2005-291326 A obtained on Feb. 22, 2021.*

(Continued)

*Primary Examiner* — Adam D Rogers
(74) *Attorney, Agent, or Firm* — Dority & Manning, P.A,

(57) ABSTRACT

A drive assembly 1 for a vehicle includes a prime mover housing section 2 and a transmission housing section 3. The prime mover housing section 2 encompasses a dry space 4, and the transmission housing section 3 encompasses an oil space 5. The oil space 5 is at least partially filled with an oil 6. A prime mover shaft 10 extends from the dry space 4 into the oil space 5. A partition 7 separates the oil space 5 from the dry space 4. A sealing device 13 seals the prime mover shaft 10 with respect to the partition 7. The sealing device 13 is arranged in the partition 7. A connecting unit 19 provides a fluidic connection between and compensates for pressure differences between the oil space 5 and the dry space 4.

15 Claims, 3 Drawing Sheets

(51) Int. Cl.
*F16H 1/06* (2006.01)
*F16H 57/027* (2012.01)
*F16H 57/029* (2012.01)

(52) U.S. Cl.
CPC ....... *F16H 57/029* (2013.01); *F16H 57/0457* (2013.01); *F16H 2057/02034* (2013.01); *F16H 2057/02043* (2013.01)

(58) Field of Classification Search
CPC ............... F16H 57/042; F16H 57/0423; F16H 57/0457; F16H 57/0493; F16H 2057/02034; F16H 2057/02043; B60K 17/22
See application file for complete search history.

(56) References Cited

U.S. PATENT DOCUMENTS

| | | | |
|---|---|---|---|
| 4,414,861 A * | 11/1983 | Witt | F16H 57/0427 184/13.1 |
| 4,465,030 A | 8/1984 | Maurer | |
| 5,038,631 A * | 8/1991 | Renk | B61C 17/08 74/467 |
| 7,878,304 B2 | 2/2011 | Reis et al. | |
| 2003/0098204 A1 | 5/2003 | Mogi | |
| 2004/0099074 A1* | 5/2004 | Brookins | F16H 1/06 74/329 |
| 2012/0096968 A1 | 4/2012 | Kawamoto et al. | |
| 2019/0195336 A1* | 6/2019 | Ichikawa | F16H 57/0423 |

FOREIGN PATENT DOCUMENTS

| | | |
|---|---|---|
| EP | 2395263 A1 | 12/2011 |
| EP | 2447574 A1 | 5/2012 |
| JP | 2005291326 A | 10/2005 |
| WO | WO 2008/155195 | 12/2008 |

OTHER PUBLICATIONS

International Search Report (English Translation) PCT/EP2017/077080, dated Jan. 24, 2018. (3 pages).

* cited by examiner

DRIVE ASSEMBLY FOR A VEHICLE, AND VEHICLE COMPRISING THE DRIVE ASSEMBLY

FIELD OF THE INVENTION

The invention relates generally to a drive arrangement for a vehicle, including a prime mover housing section and a transmission housing section. The prime mover housing section encompasses a dry space and the transmission housing section encompasses an oil space. The oil space is at least partially filled with oil. A prime mover shaft extends from the dry space into the oil space. A partition separates the oil space from the dry space. A sealing device seals the prime mover shaft with respect to the partition. The sealing device is arranged in the partition. Moreover, the invention relates to a vehicle that includes this drive arrangement.

BACKGROUND

Drive trains of vehicles can include, for example, a prime mover and a transmission, wherein the prime mover and the transmission are accommodated in separate housings. In particular, the prime mover and the transmission are spatially separated from one another and are connected to one another via an input shaft. The transmission is lubricated with the aid of a lubricant, wherein splashing losses can occur at high rotational speeds, which therefore results in high temperatures in the transmission. Due to the different degrees of heating between the two spaces, a pressure differential arises, which also negatively affects the shaft sealing ring. In order to reduce the splashing losses, for example, shielding devices are provided, which retain the lubricant and reduce the splashing.

Publication DE 103 59 109 A1, which is the closest prior art, discloses a transmission arrangement for a vehicle. The transmission arrangement can be at least partially lubricated with lubricant from a lubricant sump and includes at least two transmission sections. Each transmission section includes a transmission housing part, wherein the transmission housing parts of the two transmission sections adjoin one another and form a part of the lubricant sump. In particular, in the normal operating mode, usually either one or the other transmission section is operable. In order to reduce splashing losses of the transmission arrangement at least in most operating conditions of the vehicle, wherein the installation space provided for the transmission arrangement is not to be substantially increased, it is provided that a separating means is provided between the two transmission sections, with the aid of which the two transmission sections can be at least partially separated from each other. As a result, lubricant can be retained in the transmission housing part, the transmission section of which is not operated or is operated at a lower rotational speed in the instantaneous operating condition.

SUMMARY OF THE INVENTION

Examples aspects of the invention provide a drive arrangement having an improved operating behavior.

Preferred or advantageous embodiments of the invention result from the following description and/or the attached figures.

According to examples aspects of the invention, a drive arrangement for a vehicle is provided. In particular, the drive arrangement is a driven axle, preferably a front axle or a rear axle. It is particularly preferred when the drive arrangement is designed as a portal axle. Preferably, the drive arrangement is formed by an axle beam, at least one portal housing for forming a portal offset, and at least one wheel hub unit for accommodating at least one vehicle tire. It is particularly preferred when the axle beam is connected to a portal housing on each side and to a wheel hub unit, which arranged on the portal housing, on each side.

The axle beam may include at least one integrated prime mover or a differential gear which is connected to a prime mover, for example, via a universal joint shaft. In both cases, the prime mover is utilized for transmitting a torque to the wheel hub units. In principle, the prime mover may be designed as an internal combustion engine, in particular as a gas engine or a diesel engine. It is particularly preferred, however, when the prime mover is designed as an electric motor, that the prime mover is arranged in the axle beam. Optionally, in addition, a further prime mover may also be arranged in the axle beam, wherein a separate prime mover is associated with each wheel hub unit in this case.

The drive arrangement, in particular the portal housing, includes a transmission for transmitting the torque and for compensating for the portal offset. In particular, the transmission includes at least one input and one output. The transmission is designed, in particular, as a gear transmission or as a planetary transmission. In particular, the vehicle is a motor vehicle, preferably a passenger car or a truck, or a rail vehicle. It is particularly preferred, however, when the vehicle is a low-profile vehicle, in particular a city bus.

In particular, the transmission forms a portal stage for compensating for a portal offset. Preferably, the prime mover shaft defines a first axis of rotation and the transmission shaft defines a second axis of rotation, wherein the two axes of rotation extend in parallel, offset with respect to one another, and so, particularly preferably, the two axes are vertically offset with respect to one another. In particular, the transmission has the function of compensating for the vertical offset between the prime mover and the transmission, preferably the vertical offset between the two axes of rotation.

The drive arrangement includes a prime mover housing section and a transmission housing section. In particular, the prime mover housing section is designed as a prime mover housing for accommodating the prime mover. It is particularly preferred when the prime mover housing includes a pressure compensating tank. In particular, the transmission housing section is designed as a transmission housing for accommodating the transmission. Preferably, the prime mover housing section and the transmission housing section are two separate housings, wherein, particularly preferably, the two housing sections are connected and/or connectable to one another in a form-locking and/or force-locking and/or integrally joined manner. Alternatively, the prime mover housing section and the transmission housing section are produced as one piece, preferably in a single casting. In particular, the transmission housing section is formed by the portal housing and the prime mover housing section is formed by the axle beam.

The prime mover housing section encompasses a dry space and the transmission housing section encompasses an oil space. The oil space is at least partially filled with oil. In particular, the prime mover housing section forms the dry space and the transmission housing section forms the oil space. Preferably, the oil forms an oil sump, and so the transmission is lubricated with the aid of splash lubrication. Alternatively, the oil circulates in the oil space, and so the transmission is lubricated via recirculating lubrication. Preferably, the oil is a transmission oil. It is particularly preferred when the dry space is free from the oil. In particular, the dry space forms an air side and the oil space forms a fluid side.

The drive arrangement includes a prime mover shaft. The prime mover shaft extends from the dry space into the oil space. In particular, the prime mover shaft has the function of transmitting a drive torque of the prime mover to the transmission. Preferably, the input is formed by the prime mover shaft and the output is formed by a transmission shaft. Preferably, the prime mover is connected to the prime mover shaft in a driving manner, and the wheel hub unit is connected to the transmission shaft in a driving manner.

The drive arrangement includes a partition for separating the oil space from the dry space. In particular, the partition has the function of insulating or isolating the two spaces from one another, so that, preferably, two closed spaces are formed, which are separated from one another. In particular, the partition is formed by the prime mover housing section and/or by the transmission housing section. Alternatively, the partition is designed as a separate component of the drive arrangement. The partition is arranged between the prime mover housing section and the transmission housing section. It is particularly preferred when the partition is connected and/or connectable to the prime mover housing section and/or to the transmission housing section in an integrally joined and/or form-locking and/or force-locking manner. Alternatively, the partition and the prime mover housing section and/or the partition and the transmission housing section are designed as one piece, preferably in a single casting.

The drive arrangement includes a sealing device or seal for sealing the prime mover shaft with respect to the partition. The sealing device is arranged in the partition. In particular, the sealing device has the function of sealing off the dry space from the oil space in the area of the prime mover shaft, so that the oil is kept in the oil space and cannot penetrate the dry space. Preferably, the sealing device is a shaft sealing ring, in particular a radial shaft sealing ring and/or an axial shaft sealing ring. It is particularly preferred when the sealing device includes a rubber sealing lip and/or a plastic sealing lip. For example, the partition includes a sealing device receptacle for accommodating the sealing device. In particular, the sealing device receptacle is designed as a groove or a locating bore. In particular, the sealing device receptacle is arranged on the side of the oil space and/or on the side of the dry space.

Within the scope of the invention, it is provided that the drive arrangement includes a connecting unit for the fluidic connection and for the compensation of pressure differences between the oil space and the dry space. In particular, the fluidic connection is a weak air flow for the purpose of pressure compensation. In an operating condition of the vehicle, the oil space and the dry space have different pressures. The connecting unit has the function, in particular, of establishing a pressure equilibrium between the two spaces only by transporting air, and wherein, preferably, the entry of oil into the dry space is simultaneously prevented. In particular, the connecting unit is arranged above the oil, preferably above the oil sump. In particular, the connecting unit is arranged in an upper fourth (¼), preferably in an upper third (⅓), particularly preferably in an upper half (½) of the oil space. Preferably, the partition includes an opening. The connecting unit is arranged at or in the opening. Alternatively, the opening is the connecting unit. For example, the opening is a bore hole or a breakthrough or a cut-out. It is particularly preferred when the oil space and the dry space are fluidically insulated from one another, so that, in particular, an exchange of media, preferably air, for compensating for the pressure differences takes place only via the connecting unit.

The advantage of the invention is that, due to the connection of the oil space to the dry space, the pressure difference is equalized, and, therefore, negative effects on the sealing device no longer occur. As a result, a safe operating behavior of the drive arrangement, in particular of the prime mover shaft, is ensured. Moreover, due to the compensation of the pressure difference, the wear of the sealing device and/or of the prime mover shaft and/or of the partition is considerably reduced.

In one preferred refinement of the invention, the connecting unit is connected to the partition. In principle, the connecting unit is inseparably or integrally connected to the partition. It is particularly preferred, however, when the connecting unit is separably connected to the partition. For example, the separable connection is a bolted connection and/or a clip connection. For example, the inseparable connection is a rivet joint and/or a welded joint and/or a clip connection and/or an adhesive bond. For example, the integral connection is formed by a shaping process and/or forming process; in particular, the connecting unit is produced in a single casting with the partition. In particular, the connecting unit is connected to the partition within the oil space and/or within the dry space.

In one preferred implementation, the connecting unit includes an oil separator and/or a membrane. In particular, the connecting unit, preferably the oil separator and/or the membrane, is utilized for separating the oil from the air which flows from the oil space into the dry space via the connecting unit. In particular, the connecting unit has the function of separating oil particles from the air of the oil space, so that the purified air, preferably exclusively, is routed to the dry space.

Preferably, the oil separator is arranged within the oil space, so that the oil which has been separated out is routed to the oil space, for example, via an outlet in the connecting unit or in the oil separator. In particular, the oil separator is an oil mist separator. Preferably, the oil separator includes an electrostatic separator and/or a centrifugal separator and/or an inertial separator and/or a filtering separator and/or a gas scrubber. In particular, the oil separator is designed as a fine separator or a coarse separator.

In particular, the membrane is designed to be unidirectional or bidirectional. Preferably, the membrane is permeable, wherein an exchange of gases can take place, but the oil is retained. Preferably, the oil separator and/or the membrane are/is an integral part of the partition. It is particularly preferred when the membrane and the oil separator are accommodated in a common housing which, in turn, is connected to the partition.

In one further alternative or, optionally, additional implementation, the connecting unit includes a labyrinth for retaining the oil. In particular, the labyrinth has the function of separating the airborne oil particles from the air with the aid of an impingement separation. It is particularly preferred when the connecting unit has the function of breaking down an oil foam. Preferably, the connecting unit is designed as a labyrinth cover including a labyrinth. The labyrinth cover is particularly preferably designed as the oil separator. In particular, the labyrinth cover is arranged within the oil space, so that the oil which has been separated out is routed to the oil space, for example, via an outlet in the labyrinth cover. In particular, the labyrinth forms the fluidic connection between the oil space and the dry space. Preferably, the connecting unit includes multiple successively arranged baffles.

In one specific implementation, at least one gearwheel is arranged in the oil space. In particular, the gearwheel includes an external gearing. For example, the external gearing is a helical gearing and/or an involute gearing and/or a cycloidal gearing. Preferably, the gearwheel is designed as a spur gear. The prime mover shaft is rotationally fixed to the gearwheel and drives the gearwheel, so that the gearwheel rotates at least partially in the oil.

In one specific refinement, at least one further gearwheel is arranged in the oil space. In particular, the further gearwheel includes an external gearing and/or an inner gearing. For example, the external gearing or the internal gearing is a helical gearing and/or an involute gearing and/or a cycloidal gearing. Preferably, the gearwheel is designed as a further spur gear or as a ring gear.

The further gearwheel intermeshes with the gearwheel, and so the further gearwheel and/or the gearwheel rotate/rotates in the oil. In particular, the transmission shaft is rotationally fixed to the further gearwheel or is connected to the further gearwheel in a driving manner.

In a first possible embodiment, the gearwheel and the further gearwheel are designed as spur gears, so that preferably one spur gear stage is formed. Alternatively, the transmission shaft additionally includes an output gear. The output gear is rotationally fixed to the transmission shaft. The output gear and the gearwheel are designed as spur gears and the further gearwheel is designed as a ring gear, so that, for example, a planetary transmission is formed. For this purpose, the transmission may include, optionally in addition, further gearwheels as planet gears or a sun gear, etc.

In one structural refinement, at least one shielding device is arranged in the oil space for shielding the gearwheel and/or the further gearwheel from the oil. In particular, the shielding device has the function of shielding against oil slung by a rotating transmission component, so that the oil is stabilized and/or less oil is carried along or accelerated. The advantage of the shielding device is that splashing losses are reduced and, therefore, a heating-up of the oil is reduced.

The shielding device is arranged between the transmission housing section and the gearwheel, below the gearwheel. In particular, the shielding device is arranged in the center below the gearwheel and/or the further gearwheel. Preferably, the shielding device is arranged partially or completely in the oil sump.

In particular, the shielding device is trough-like and/or plate-like. Preferably, the shielding device has a concave and/or semicircular and/or box-like cross-section. It is particularly preferred when the shielding device has a bend radius which is greater than or equal to a radius of the gearwheel and/or of the further gearwheel. In particular, the center of the bend radius is concentric or offset with respect to the center of the radius of the gearwheel and/or of the further gearwheel. Preferably, the center of the bend radius is above or below the center of the radius of the gearwheel and/or of the further gearwheel. The shielding device is preferably designed as a circle arc segment as viewed axially with respect to a main axis of rotation. In particular, the shielding device extends over an angular range of more than thirty degrees (30°), preferably more than eighty degrees (80°), in particular more than one hundred and thirty degrees (130°). Alternatively or, optionally, in addition, the shielding device extends over an angular range of less than one hundred and fifty degrees (150°), preferably less than one hundred degrees (100°), in particular less than fifty degrees (50°). In particular, the shielding device is made of a plastic or a metal alloy. Preferably, the shielding device is designed as a shaped sheet-metal part or as a plastic injection-molded part.

In particular, the shielding device is spaced apart from the gearwheel and/or the further gearwheel. In particular, the distance between the gearwheel and the shielding device or between the further gearwheel and the shielding device is more than one millimeter (1 mm), preferably more than ten millimeters (10 mm), in particular more than twenty millimeters (20 mm). Alternatively or, optionally, in addition, the distance is less than thirty millimeters (30 mm), preferably less than fifteen millimeters (15 mm), in particular less than five millimeters (5 mm).

In principle, the shielding device is integrally or inseparably connected to the prime mover housing section and/or to the transmission housing section and/or to the partition. It is particularly preferred, however, when the shielding device is separably connected to the prime mover housing section and/or to the transmission housing section and/or to the partition. For example, the separable connection is a bolted connection and/or a clip connection. For example, the inseparable connection is a rivet joint and/or a welded joint and/or a clip connection and/or an adhesive bond. For example, the integral connection is formed by a shaping process and/or forming process; in particular, the shielding device is produced in a single casting together with the prime mover housing section and/or with the transmission housing section and/or the partition.

In one further structural refinement, at least one stripper device is arranged in the oil space for stripping the oil from the gearwheel and/or from the further gearwheel. In particular, the stripper device has the function of stripping the oil transported in the circumferential direction by the gearwheel and/or by the further gearwheel, so that the oil is stabilized. The advantage of the stripper device is that the splashing losses are further reduced and, therefore, a heating-up of the oil is likewise reduced. Preferably, the stripper device is utilized for keeping the oil in the lower area of the oil space, so that a venting or the pressure compensation with the aid of the connecting unit is ensured.

The stripper device is arranged between the transmission housing section and the gearwheel. In particular, the stripper device is arranged to the left and/or to the right of the gearwheel and/or the further gearwheel, so that the stripper device intercepts the oil transported by the gearwheel and/or by the further gearwheel and conveys the oil, via the contour of the stripper device, to the oil sump. In particular, the stripper device is partially arranged in the oil sump.

In particular, the stripper device is trough-like and/or plate-like. Preferably, the stripper device has a curved shape, particularly preferably a concave and/or semicircular cross-section. It is particularly preferred when the stripper device has a bend radius which is considerably smaller than the bend radius of the shielding device. In particular, the stripper device is made of a plastic or a metal alloy. Preferably, the stripper unit is designed as a shaped sheet-metal part or as a plastic injection-molded part.

In particular, the stripper device includes a stripper section and a return section. Preferably, the stripper section is arranged tangentially or at least approximately tangentially to the gearwheel and/or to the further gearwheel. It is particularly preferred when the return section directly adjoins the stripper section. The stripper section and the return section are integrally connected to one another, for example, having been produced in a common casting. In particular, the stripper section and the return section have/has the curved shape.

In particular, the stripper device is spaced apart from the gearwheel and/or the further gearwheel. In particular, the distance between the gearwheel and the stripper device and/or between the further gearwheel and the stripper device is more than a tenth of a millimeter (0.1 mm), preferably more than one millimeter (1 mm), in particular more than ten millimeters (10 mm). Alternatively or, optionally, in addition, the distance is less than fifteen millimeters (15 mm), preferably less than five millimeters (5 mm), in particular less than a half millimeter (0.5 mm).

In principle, the stripper device is inseparably or integrally connected to the prime mover housing section and/or to the transmission housing section and/or to the partition. It is particularly preferred, however, when the stripper device is separably connected to the prime mover housing section and/or to the transmission housing section and/or to the partition. In particular, the stripper device is produced in a single casting together with the prime mover housing section and/or with the transmission housing section and/or the partition.

In one preferred implementation, the shielding device and the stripper device define an oil flow, so that the oil is guided in the oil space in a controlled manner. In particular, the shielding device and the stripper device together have the function, during an operating condition of the drive arrangement, of routing oil, which is transported in the circumferential direction due to the rotation of the gearwheel and/or the further gearwheel, to the oil sump. Preferably, the shielding device and the stripper device define the oil flow via their geometric design. It is particularly preferred when oil arranged, for example, between the gearwheel and the shielding device or between the further gearwheel and the shielding device is transported in the circumferential direction by the gearwheel and/or the further gearwheel and, in particular, additionally in the circumferential direction with the aid of the shielding device. It is particularly preferred when the oil is subsequently largely stripped from the gearwheel and/or the further gearwheel with the aid of the stripper device and is routed to the oil sump.

In one preferred embodiment, the drive arrangement includes an electric motor for driving the prime mover shaft. The electric motor is arranged in the prime mover housing section. In particular, the electric motor is arranged in the dry space. Preferably, the electric motor is a synchronous motor and/or a DC motor and/or an asynchronous motor.

One further object of the invention is a vehicle including the drive arrangement of the type described above and as claimed in one of the preceding claims.

BRIEF DESCRIPTION OF THE DRAWINGS

Further features, advantages, and effects of the invention result from the following description of preferred exemplary embodiments of the invention. Wherein.

Mutually corresponding or identical parts are provided with the same reference characters in the figures.

DETAILED DESCRIPTION

Figure 1:
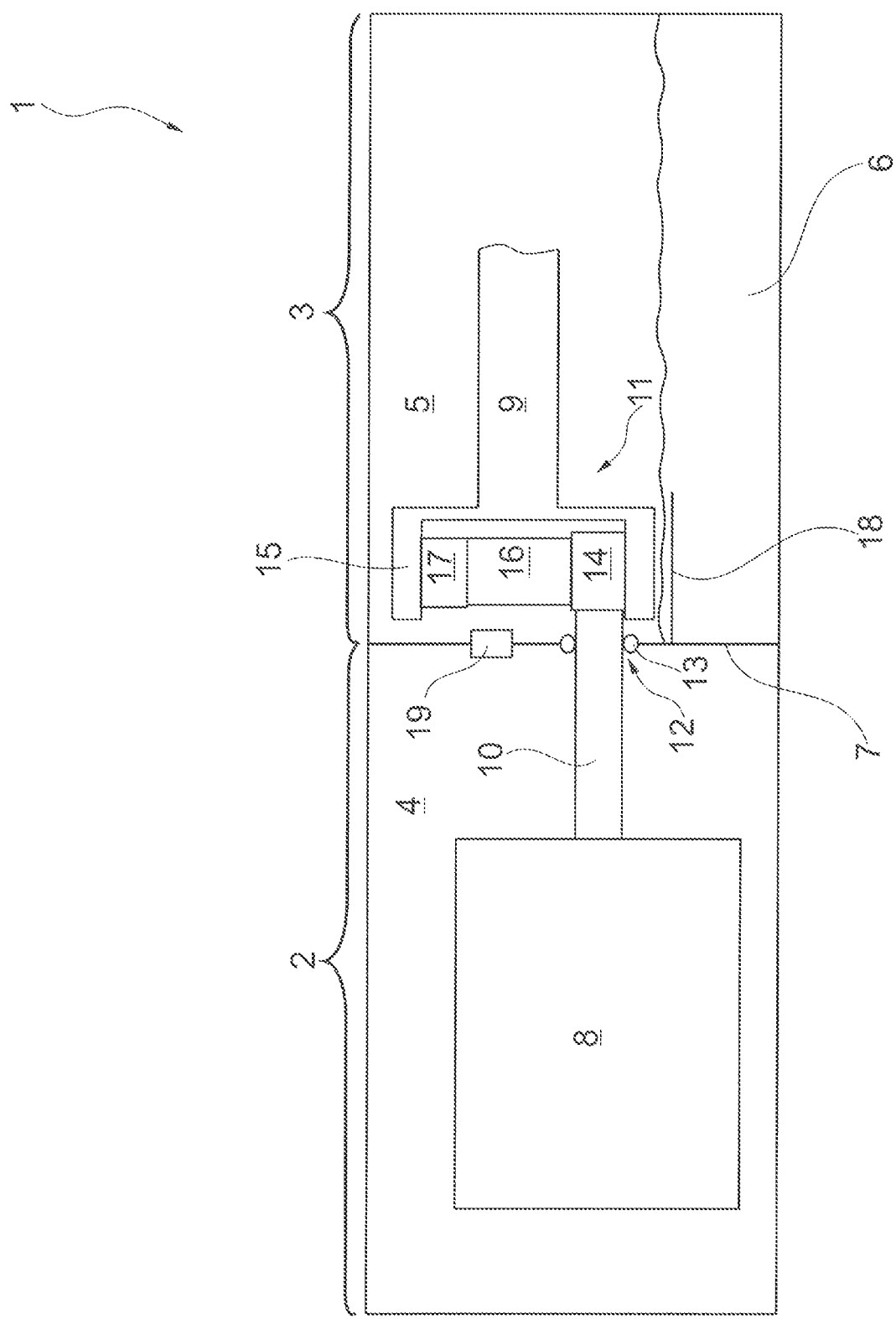
FIG. 1 shows a schematic of a drive arrangement including a prime mover housing section and a transmission housing section, as a first exemplary embodiment of the invention.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a highly simplified schematic of a drive arrangement 1 for a vehicle, for example, a motor vehicle, a two-wheeled vehicle, etc., as a first exemplary embodiment of the invention. The drive arrangement 1 includes a prime mover housing section 2 and a transmission housing section 3. For example, the two housing sections 2, 3 are produced in a single casting or consist of two separate housings, wherein the two housing sections 2, 3 are, for example, welded together, bolted together, etc. For example, the drive arrangement 1 is designed as a portal axle for a bus, wherein the prime mover housing section 2 is formed by an axle beam and the transmission housing section 3 is formed by a portal housing.

The prime mover housing section 2 forms a dry space 4 and the transmission housing section 3 forms an oil space 5. The oil space 5 is at least partially filled with oil 6, and so, for example, an oil sump is formed. The two spaces 4, 5 are separated from each other by a partition 7, so that two spaces are formed, which are separated from one another. For example, the partition 7 is a part of the prime mover housing section 2 or of the transmission housing section 3. Alternatively, the partition 7 is, for example, a single component which is or can be arranged between the two housing sections 2, 3.

A prime mover 8, for example, an electric motor, is arranged in the dry space 4 and a transmission 11, in particular a planetary transmission, is arranged in the oil space 5. The oil 6 is utilized for lubricating the transmission 11, for example, with the aid of splash lubrication. The motor 8 and the transmission 11 are connected to one another in a driving manner via a prime mover shaft 10. The motor 8 transmits a drive torque to the prime mover shaft 10 and, therefore, to the transmission 11.

The prime mover shaft 10 is guided through an opening 12, for example, a bore hole, in the partition 7. The partition 7 includes a sealing device 13 for sealing the prime mover shaft 10 with respect to the partition 7. For example, the sealing device 13 is a shaft sealing ring, wherein the shaft sealing ring is arranged in the opening 12. For example, air is the only medium present in the dry space 4, and air and the oil 6 are the media present in the oil space 5. The sealing device 13 prevents the oil 6 from the oil space 5 from entering the dry space 4 through the opening 12.

A gearwheel 14 is rotationally fixed to the prime mover shaft 10. The transmission 11 includes a further gearwheel 15 as well as a first planetary transmission gearwheel 16 and a second planetary transmission gearwheel 17. The first planetary transmission gearwheel 16 is designed as a sun gear and the second planetary transmission gearwheel 17 is designed as a planet gear. In the exemplary embodiment shown, the gearwheel 14, the further gearwheel 15, the first planetary transmission gearwheel 16, and the second planetary transmission gearwheel 17 form a portal stage for compensating for a portal offset. The further gearwheel 15 is designed as a ring gear and is rotationally fixed to a transmission shaft 9. The prime mover shaft 10 forms an input and the transmission shaft 9 forms an output. For example, the transmission shaft 9 is connected to a wheel hub unit to which at least one vehicle tire is attached, wherein a torque from the motor 8 is transmitted onto the prime mover shaft 10, across the transmission 11 and, therefore, onto the transmission shaft 9.

A shielding device 18 for reducing splashing losses is arranged in the dry space 5. The shielding device 18 is connected to the partition 7, for example, in an integrally joined and/or form-locking and/or force-locking manner. For example, the shielding device 18 is designed as a shaped sheet-metal part. The shielding device 18 is arranged below the further gearwheel 15 and at least partially in the oil 6, so that the further gearwheel 15 is shielded from the oil 6 and the oil 6 is shielded from the rotating further gearwheel 15.

A pressure difference arises in the two spaces 4, 5 due, for example, to temperature differences. The drive arrangement 1 includes a connecting unit 19 in order to compensate for this pressure difference. The connecting unit 19 is connected, for example, to the partition 7 or to a part of the partition 7 and fluidically connects the oil space 5 to the dry space 4. For example, the connecting unit 19 is connected to the partition 7 in a force-locking and/or integrally joined and/or form-locking manner. Due to the fluidic connection, a pressure equilibrium sets in between the two spaces 4, 5, and so the same pressure prevails in the two spaces 4, 5.

Figure 2:
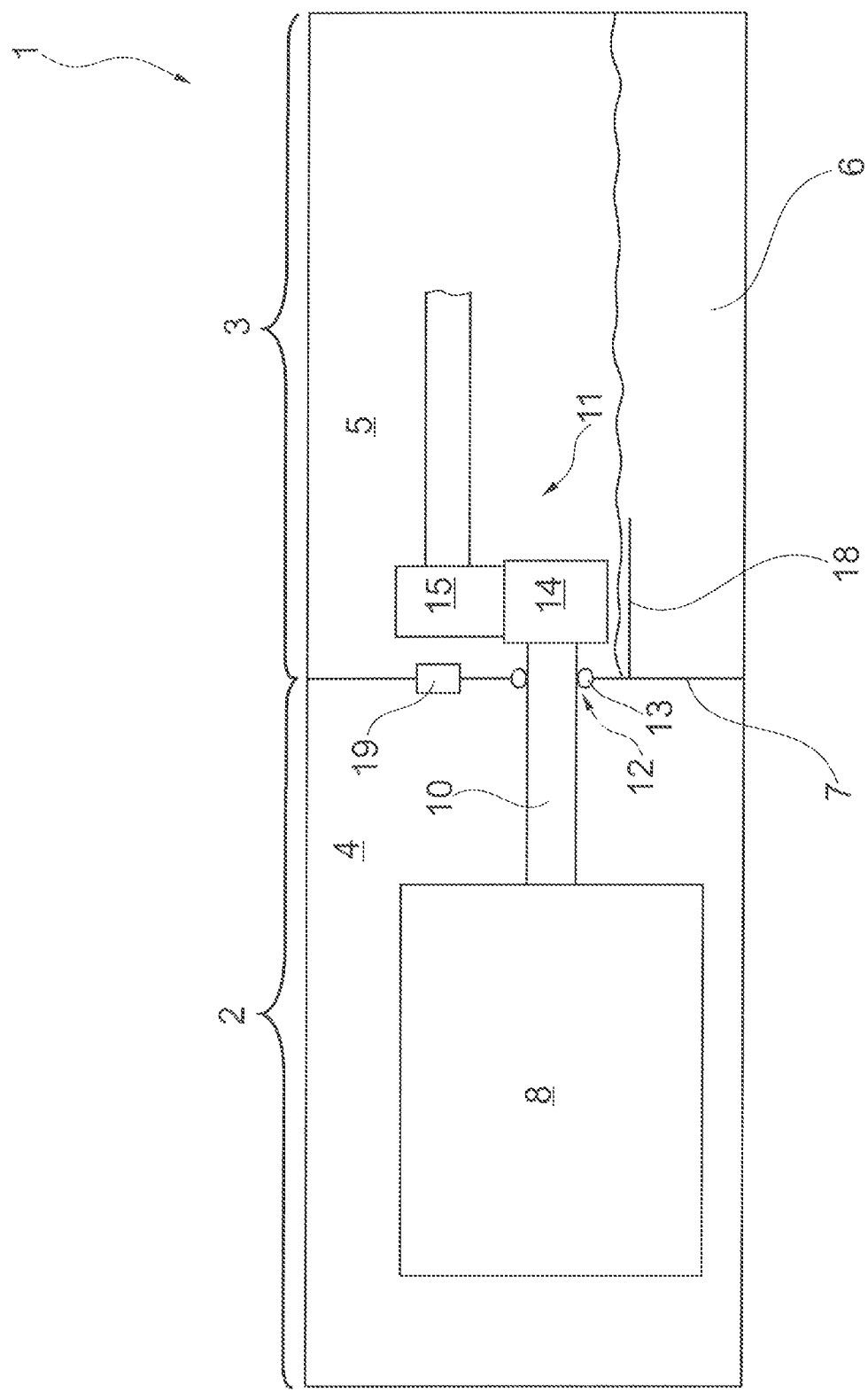
FIG. 2 shows a schematic of the drive arrangement including the prime mover housing section and the transmission housing section, as a second exemplary embodiment of the invention.

FIG. 2 shows, in the same representation as in FIG. 1, the drive arrangement 1 as an alternative exemplary embodiment of the invention. In this case, the transmission 11 is designed as a gear transmission, wherein the further gearwheel 15 is designed as a spur gear in this case. Therefore, the gearwheel 14 and the further gearwheel 15 form a spur gear stage as the portal stage. The shielding device 18 is arranged below the gearwheel 14 and at least partially in the oil 6, so that the gearwheel 14 is shielded from the oil 6 and the oil 6 is shielded from the rotating gearwheel 14.

Figure 3:
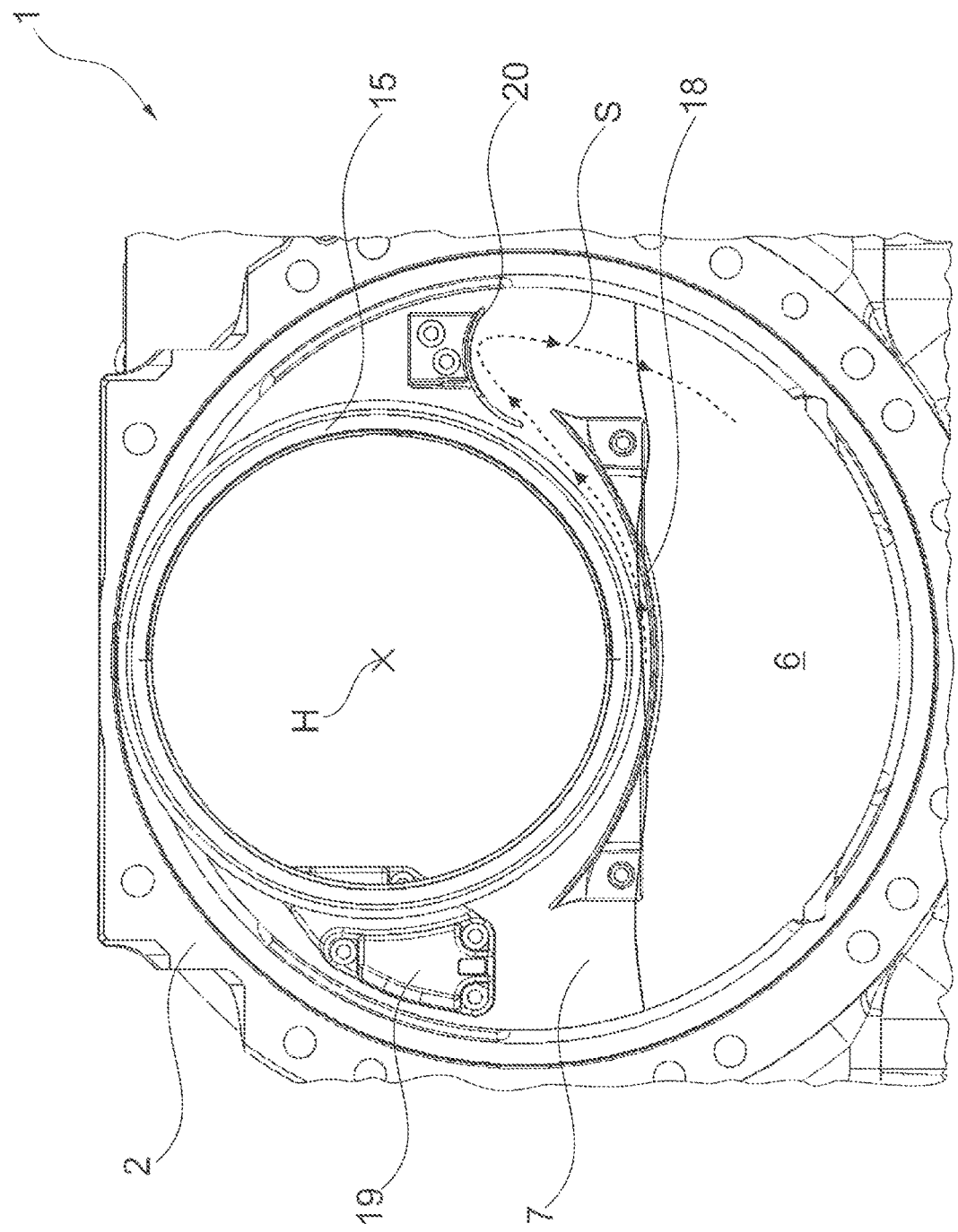
FIG. 3 shows a front view of the drive arrangement as viewed from an oil space of the transmission housing section.

FIG. 3 shows a front view of the drive arrangement 1 from FIG. 1, including the prime mover housing section 2, the further gearwheel 15, and the partition 7 as viewed from the oil space 5. The further gearwheel 15 defines a main axis of rotation H, wherein, in an operating condition, the further gearwheel 15 turns about the main axis of rotation H. The connecting unit 19, for example, a labyrinth cover for separating out the oil 6, is arranged on the partition 7, laterally adjacent to the gearwheel 15 above the oil 6. In the embodiment shown, the connecting unit 19 is arranged outside the ring gear. Alternatively, however, the connecting unit 19 can also be arranged, for example, within the ring gear. For example, the connecting unit 19 is bolted, riveted, etc., to the partition 7 on the side of the oil space 5.

On the opposite side, a stripper device 20 is arranged laterally adjacent to the further gearwheel 15. For example, the stripper device 20 is designed as a shaped sheet-metal part and is bolted, riveted, welded, etc., to the partition 7. The stripper device 20 has an arched or curved cross-section, wherein the stripper device 20 extends, for example, approximately tangentially, from the further gearwheel 15 in the direction of the transmission housing section 3 (not represented in the view shown). The stripper device 20 is spaced apart from the further gearwheel 15, wherein the distance is, for example, less than one millimeter (1 mm).

The stripper device 20 is utilized for stripping the oil 6 carried along in the circumferential direction with respect to the main axis of rotation H due to the rotation of the further gearwheel 15, so that the oil 6 is routed, for example, back to the oil sump.

The shielding device 18 is arranged on the partition 7 in the center below the further gearwheel 15. For example, the shielding device 18 is bolted, riveted, welded, etc., to the partition 7. The shielding device 18 has an arched or curved cross-section. The shielding device 18 has a bend radius which is greater than an outer radius of the further gearwheel 15, wherein the center of the bend radius is offset above the main axis of rotation H. The shielding device 18 is, in particular, trough-like, wherein the lowest point of the trough is situated perpendicularly to the main axis of rotation H. The shielding device 18 is spaced apart from the further gearwheel 15, wherein the distance is, for example, greater than one millimeter (1 mm).

The oil 6 is moved in the transmission housing section 3 during an operating condition of the drive arrangement 1. The shielding device 18 and the stripper device 20 define an oil flow S for the oil 6 which is conveyed in the circumferential direction with respect to the main axis of rotation H due to the rotation of the further gearwheel 15. The accumulated oil 6, which is arranged, for example, between the shielding device 18 and the further gearwheel 15, is carried along in the circumferential direction by the further gearwheel 15. The oil 6 is stripped from the further gearwheel 15 at the stripper device 20 and, for example, is routed back to the oil sump formed by the oil 6. As a result, in particular, the oil 6 is stabilized, and so the splashing losses are reduced and, due to the shielding device 18, less oil 6 is set into motion, Moreover, the stripper unit 20 prevents the oil 6 from being transported further to the connecting unit 19. As a result, a trouble-free venting of the oil space 5 via the connecting unit 19, and the pressure compensation associated therewith, is ensured.

Modifications and variations can be made to the embodiments illustrated or described herein without departing from the scope and spirit of the invention as set forth in the appended claims.

REFERENCE CHARACTERS 1 drive arrangement
2 prime mover housing section
3 transmission housing section
4 dry space
5 oil space
6 oil
7 partition
8 prime mover
9 transmission shaft
10 prime mover shaft
11 transmission
12 opening
13 sealing device
14 gearwheel
15 further gearwheel
16 first planetary transmission gearwheel
17 second planetary transmission gearwheel
18 shielding device
19 connecting unit
20 stripper device
H main axis of rotation
S oil flow

The invention claimed is:

1. A drive assembly (1) for a vehicle, comprising:
    a prime mover housing section (2) encompassing a dry space (4);
    a transmission housing section (3) encompassing an oil space (5), the oil space (5) at least partially filled with an oil (6);
    a partition (7) separating the oil space (5) from the dry space (4);
    a prime mover shaft (10) extending from the dry space (4) into the oil space (5);
    an electric motor for driving the prime mover shaft (10), the electric motor arranged in the prime mover housing section (2);
    a sealing device (13) sealing the prime mover shaft (10) with respect to the partition (7), the sealing device (13) arranged in the partition (7); and
    a connecting unit (19) providing a fluidic connection between the oil space (5) and the dry space (4) in order to compensate for pressure differences between the oil space (5) and the dry space (4),
    wherein the connecting unit (19) is mounted on the partition (7), and
    wherein air is flowable back and forth between the oil space (5) and the dry space (4) through the connecting unit (19).

2. The drive assembly (1) of claim 1, wherein the connecting unit (19) comprises one or both of an oil separator for separating out the oil (6) and a membrane.

3. The drive assembly (1) of claim 1, wherein the connecting unit (19) comprises a labyrinth for retaining the oil (6) in the oil space (5).

4. The drive assembly (1) of claim 1, further comprising a gearwheel (14) arranged in the oil space (5), the prime mover shaft (10) rotationally fixed to the gearwheel (14) and configured to drive the gearwheel (14), the gearwheel (14) at least partially rotatable through the oil (6).

5. The drive assembly (1) of claim 4, further comprising at least one stripper (20) arranged in the oil space (5), the stripper (20) removing the oil (6) from one or both of the gearwheel (14) and a further gearwheel (15), the stripper (20) arranged between the transmission housing section (3) and the gearwheel (14), the stripper (20) arranged laterally adjacent to one or both of the gearwheel (14) and the further gearwheel (15).

6. The drive assembly (1) of claim 5, wherein a shield (18) and the stripper (20) define an oil flow path (S) such that the oil (6), which is carried along and slung off in an upward direction at the shield (18) by one or both of the gearwheel (14) and the further gearwheel (15), is at least partially intercepted and removed by the stripper (20).

7. The drive assembly (1) of claim 4, further comprising at least one further gearwheel (15) arranged in the oil space (5), the further gearwheel (15) meshed with the gearwheel (14), the further gearwheel (15) at least partially rotatable in the oil (6).

8. The drive assembly (1) of claim 7, further comprising at least one shield (18) arranged in the oil space (5), the shield (18) arranged between the transmission housing section (3) and the gearwheel (14), the shield (18) arranged below the gearwheel (14).

9. The drive assembly (1) of claim 8, wherein the shield (18) has a concave cross-section with a bend radius greater than a radius of the one or both of the gearwheel (14) and the further gearwheel (15).

10. The drive assembly (1) of claim 9, wherein a center of the bend radius is concentric with a center of the radius of the one or both of the gearwheel (14) and the further gearwheel (15).

11. The drive assembly (1) of claim 8, wherein an angular range of the shield (18) is no less than thirty degrees and no greater than one hundred and fifty degrees.

12. The drive assembly (1) of claim 8, further comprising at least one stripper (20) arranged in the oil space (5), the stripper (20) removing the oil (6) from one or both of the gearwheel (14) and the further gearwheel (15), the stripper (20) arranged between the transmission housing section (3) and the gearwheel (14), the stripper (20) arranged laterally adjacent to one or both of the gearwheel (14) and the further gearwheel (15),
    wherein the shield (18) and the stripper (20) define an oil flow path (S) such that the oil (6), which is carried along and slung off in an upward direction at the shield (18) by one or both of the gearwheel (14) and the further gearwheel (15), is at least partially intercepted and removed by the stripper (20).

13. The drive assembly (1) of claim 12, wherein the stripper (20) has a downwardly facing concave cross-section.

14. The drive assembly (1) of claim 12, wherein the stripper (20) is positioned proximate a first side of the further gearwheel (15) and the connecting unit (19) is positioned proximate a second, opposite side of the further gearwheel (15).

15. A vehicle comprising the drive assembly (1) of claim 1.

* * * * *